US012628206B2

(12) United States Patent
Zhang et al.

(10) Patent No.: US 12,628,206 B2
(45) Date of Patent: May 12, 2026

(54) METHODS AND APPARATUSES FOR A USER EQUIPMENT (UE) TRIGGERED SECONDARY CELL GROUP (SCG) ACTIVATION PROCEDURE

(71) Applicant: Lenovo (Beijing) Limited, Beijing (CN)

(72) Inventors: Congchi Zhang, Shanghai (CN); Lianhai Wu, Beijing (CN); Mingzeng Dai, Shanghai (CN); Le Yan, Shanghai (CN)

(73) Assignee: Lenovo (Beijing) Limited, Beijing (CN)

( * ) Notice: Subject to any disclaimer, the term of this patent is extended or adjusted under 35 U.S.C. 154(b) by 314 days.

(21) Appl. No.: 18/283,352

(22) PCT Filed: Mar. 26, 2021

(86) PCT No.: PCT/CN2021/083210
§ 371 (c)(1),
(2) Date: Sep. 21, 2023

(87) PCT Pub. No.: WO2022/198626
PCT Pub. Date: Sep. 29, 2022

(65) Prior Publication Data
US 2024/0057172 A1     Feb. 15, 2024

(51) Int. Cl.
*H04W 74/08*        (2024.01)
*H04W 74/0833*       (2024.01)
*H04W 76/19*        (2018.01)

(52) U.S. Cl.
CPC ....... *H04W 74/0833* (2013.01); *H04W 76/19* (2018.02)

(58) Field of Classification Search
CPC ......... H04W 74/0833; H04W 74/0836; H04W 74/0838; H04W 76/10; H04W 76/19; H04W 76/18; H04W 76/15
See application file for complete search history.

(56) References Cited

U.S. PATENT DOCUMENTS 12,003,983 B2 *    6/2024    Lee ...................... H04L 5/0032
2020/0059395 A1    2/2020    Chen
(Continued)

FOREIGN PATENT DOCUMENTS

CN        106538034 A        3/2017
WO        2020197306 A1     10/2020

OTHER PUBLICATIONS 21932250.0 , "Communication Pursuant to Rule 164(1) EPC", EP Application No. 21932250.0, Nov. 5, 2024, 18 pages.
(Continued)

*Primary Examiner* — Frank Duong
(74) *Attorney, Agent, or Firm* — FIG. 1 Patents

(57) ABSTRACT

Embodiments of the present disclosure relate to methods and apparatuses for a user equipment (UE) triggered secondary cell group (SCG) activation procedure in a multi-radio dual connectivity (MR-DC) scenario. According to an embodiment of the present disclosure, a method which may be performed by a UE includes: deciding whether to activate a SCG associated with a secondary node (SN), wherein the SCG has been deactivated; and in response to deciding to activate the SCG, triggering a random access (RA) procedure to the SN.

20 Claims, 6 Drawing Sheets

(56) References Cited

U.S. PATENT DOCUMENTS

| | | | | |
|---|---|---|---|---|
| 2022/0132333 | A1* | 4/2022 | Mattam | H04L 5/0035 |
| 2022/0394583 | A1* | 12/2022 | Deenoo | H04W 36/305 |
| 2023/0085746 | A1* | 3/2023 | Wu | H04W 76/15 |
| | | | | 370/331 |
| 2023/0217398 | A1* | 7/2023 | Kim | H04W 76/20 |
| | | | | 370/503 |
| 2024/0008144 | A1* | 1/2024 | Van Der Velde | H04W 76/15 |
| 2024/0072984 | A1* | 2/2024 | Wu | H04W 76/22 |

OTHER PUBLICATIONS

3GPP , "Evolved Universal Terrestrial Radio Access (E-UTRA) and NR; Multi-connectivity; Stage 2 (Release 16)", 3GPP TS 37.340 V16.4.0, 3rd Generation Partnership Project; Technical Specification Group Radio Access Network;, Dec. 2020, 84 pages.

"Extended European Search Report", EP Application No. 21932250. 0, Feb. 10, 2025, 16 pages.

Lenovo , et al., "General issues on SCG activation and deactivation", 3GPP TSG-RAN WG2 Meeting #113e, R2-2101121, Online [retrieved Nov. 14, 2023]. Retrieved from the Internet <https://www. 3gpp.org/ftp/tsg_ran/WG2_RL2/TSGR2_113-e/Docs>, Jan. 2021, 5 pages.

Lenovo , "On SCG deactivation and activation", 3GPP TSG-RAN WG2 Meeting #112e, R2-2009867, Online [retrieved Nov. 14, 2023]. Retrieved from the Internet <https://www.3gpp.org/ftp/TSG_ RAN/WG2_RL2/TSGR2_112-e/Docs>, Nov. 2020, 3 pages.

PCT/CN2021/083210 , "International Preliminary Report on Patentability", PCT Application No. PCT/CN2021/083210, Oct. 5, 2023, 6 pages.

PCT/CN2021/083210 , "International Search Report and Written Opinion", PCT Application No. PCT/CN2021/083210, Dec. 29, 2021, 7 pages.

* cited by examiner

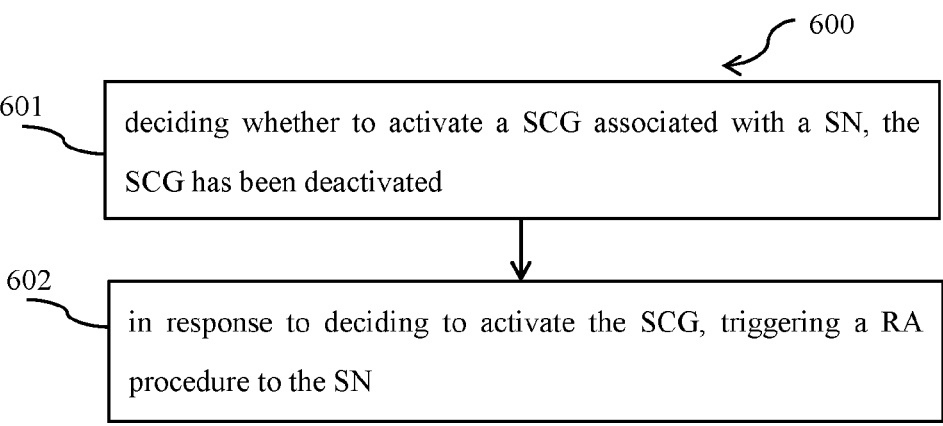

600

601 — deciding whether to activate a SCG associated with a SN, the SCG has been deactivated 602 — in response to deciding to activate the SCG, triggering a RA procedure to the SN

FIG. 6

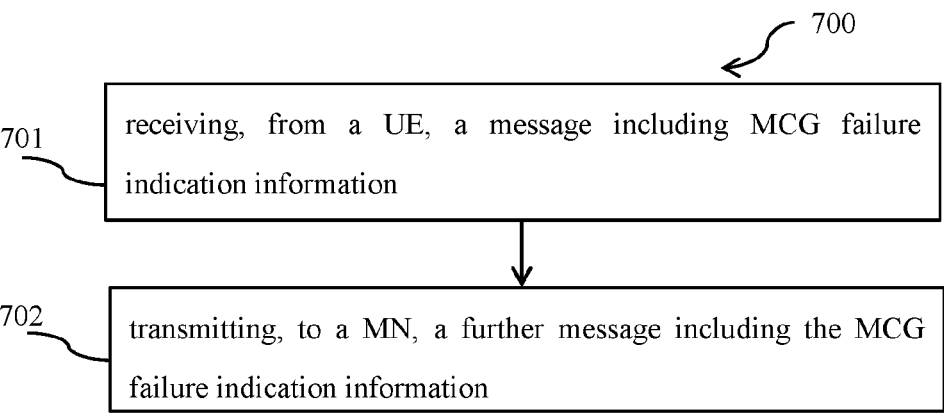

700

701 — receiving, from a UE, a message including MCG failure indication information 702 — transmitting, to a MN, a further message including the MCG failure indication information

FIG. 7

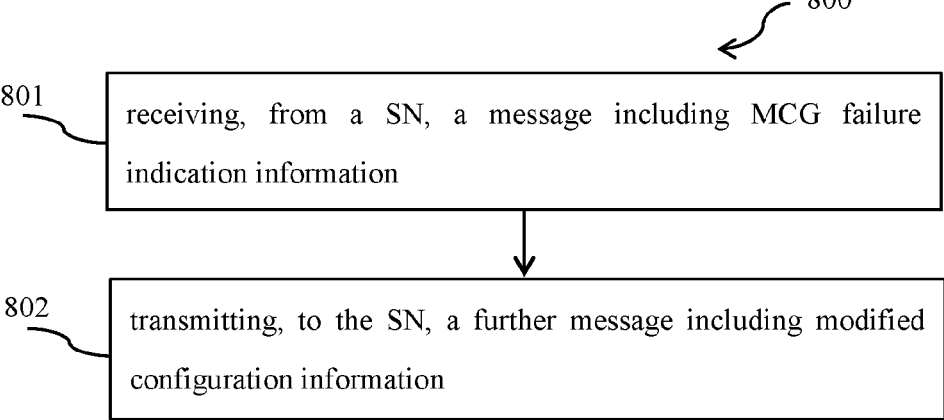

800

801 — receiving, from a SN, a message including MCG failure indication information 802 — transmitting, to the SN, a further message including modified configuration information

FIG. 8

METHODS AND APPARATUSES FOR A USER EQUIPMENT (UE) TRIGGERED SECONDARY CELL GROUP (SCG) ACTIVATION PROCEDURE

TECHNICAL FIELD

The present application generally relates to wireless communication technology, and especially to methods and apparatuses for a user equipment (UE) triggered secondary cell group (SCG) activation procedure in a multi-radio dual connectivity (MR-DC) scenario.

BACKGROUND

Next generation radio access network (NG-RAN) supports a multi-radio dual connectivity (MR-DC) operation. In a MR-DC scenario, a user equipment (UE) with multiple transceivers may be configured to utilize resources provided by two different nodes connected via non-ideal backhauls. Wherein one node may provide new radio (NR) access and the other one node may provide either evolved-universal mobile telecommunication system (UMTS) terrestrial radio access (UTRA) (E-UTRA) or NR access. One node may act as a master node (MN) and the other node may act as a secondary node (SN). The MN and SN are connected via a network interface (for example, Xn interface as specified in 3rd Generation Partnership Project (3GPP) standard documents), and at least the MN is connected to the core network.

Currently, in a 3GPP 5G system or network, details of a UE triggered SCG activation procedure in a MR-DC scenario have not been discussed in 3GPP 5G technology yet.

SUMMARY

Some embodiments of the present application provide a method, which may be performed by a UE. The method includes: deciding whether to activate a SCG associated with a SN, wherein the SCG has been deactivated; and in response to deciding to activate the SCG, triggering a random access (RA) procedure to the SN.

Some further embodiments of the present application provide a method, which may be performed by a UE. The method includes: receiving configuration information regarding one or more timers from a SN, the one or more timers are associated with a deactivated state of a SCG, and the one or more timers relate to a RA procedure; and triggering the RA procedure to the SN.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement any of the abovementioned methods performed by a UE.

Some embodiments of the present application provide a method for wireless communications. The method may be performed by a radio access network (RAN) node, e.g., a SN. The method includes: receiving, from a UE, a message including MCG failure indication information; and transmitting, to a MN, another message including the MCG failure indication information.

Some embodiments of the present application provide a method, which may be performed by a RAN node, e.g., a MN. The method includes: receiving, from a SN, a message including MCG failure indication information; and transmitting, to the SN, another message including modified configuration information.

Some embodiments of the present application provide a method, which may be performed by a RAN node, e.g., a SN. The method includes: transmitting configuration information regarding one or more timers to a UE, wherein the one or more timers are associated with a deactivated state of a SCG, and wherein the one or more timers relate to a RA procedure; and receiving a RA request message from the UE.

Some embodiments of the present application provide an apparatus for wireless communications. The apparatus comprises: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement any of the abovementioned methods performed by a RAN node.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 6 illustrates an exemplary flow chart of a method for triggering a RA procedure to a SN according to some embodiments of the present application;

FIG. 7 illustrates an exemplary flow chart of a method for receiving MCG failure indication information according to some embodiments of the present application;

FIG. 8 illustrates a further exemplary flow chart of a method for receiving MCG failure indication information according to some embodiments of the present application;

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8, B5G, 6G, and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
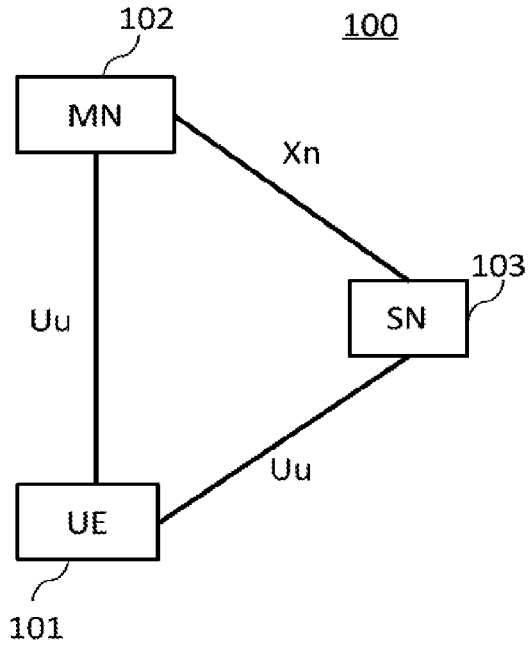
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, the wireless communication system 100 may be a dual connectivity system 100, including at least one UE 101, at least one MN 102, and at least one SN 103. In particular, the dual connectivity system 100 in FIG. 1 includes one shown UE 101, one shown MN 102, and one shown SN 103 for illustrative purpose. Although a specific number of UEs 101, MNs 102, and SNs 103 are depicted in FIG. 1, it is contemplated that any number of UEs 101, MNs 102, and SNs 103 may be included in the wireless communication system 100.

Referring to FIG. 1, UE 101 may be connected to MN 102 and SN 103 via a network interface, for example, the Uu interface as specified in 3GPP standard documents. MN 102 and SN 103 may be connected with each other via a network interface, for example, the Xn interface as specified in 3GPP standard documents. MN 102 may be connected to the core network via a network interface (not shown in FIG. 1). UE 102 may be configured to utilize resources provided by MN 102 and SN 103 to perform data transmission.

MN 102 may refer to a radio access node that provides a control plane connection to the core network. In an embodiment of the present application, in the E-UTRA-NR Dual Connectivity (EN-DC) scenario, MN 102 may be an eNB. In another embodiment of the present application, in the next generation E-UTRA-NR Dual Connectivity (NGEN-DC) scenario, MN 102 may be an ng-eNB. In yet another embodiment of the present application, in the NR-E-UTRA Dual Connectivity (NE-DC) scenario or the NR-NR Dual Connectivity (NR-DC) scenario, MN 102 may be a gNB.

MN 102 may be associated with a master cell group (MCG). The MCG may refer to a group of serving cells associated with MN 102, and may include a primary cell (PCell) and optionally one or more secondary cells (SCells) of the MCG. The PCell may provide a control plane connection to UE 101.

SN 103 may refer to a radio access node without a control plane connection to the core network but providing additional resources to UE 101. In an embodiment of the present application, in the EN-DC scenario, SN 103 may be an en-gNB. In another embodiment of the present application, in the NE-DC scenario, SN 103 may be a ng-eNB. In yet another embodiment of the present application, in the NR-DC scenario or the NGEN-DC scenario, SN 103 may be a gNB.

SN 103 may be associated with a secondary cell group (SCG). The SCG may refer to a group of serving cells associated with SN 103, and may include a primary cell of a second cell group (PSCell) and optionally one or more secondary cells (SCells). The PCell of the MCG and the PSCell of the SCG may also be referred to as a primary cell of a master or secondary cell group (SpCell).

In some embodiments of the present application, UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, UE 101 may include a portable wireless communication device, a smart phone, a cellular telephone, a flip phone, a device having a subscriber identity module, a personal computer, a selective call receiving circuitry, or any other device that is capable of sending and receiving communication signals on a wireless network.

In some other embodiments of the present application, UE 101 may include wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

According to agreements of 3GPP standard documents, Release 17 work item on NR supports an efficient SCG activation or deactivation procedure in a MR-DC scenario. In an EN-DC deployment, power consumptions of a UE and a network are a big issue, due to maintaining two radio links simultaneously. In some cases, a NR UE power consumption is 3 to 4 times higher than LTE. In an EN-DC deployment, a MN provides the basic coverage. When a UE data rate requirement changes dynamically, e.g., from high to low, a SN is worth considering to be (de)activated to save energy consumptions of the network and the UE.

Currently, a UE can trigger a SCG activation procedure via either: Option 1: sending a RRC message or a MAC CE to a MCG indicating that a UE wants to activate a SCG due to, e.g., UL data arrival at SCG bearer; or Option 2: starting a RA procedure towards the deactivated SCG, then, a SN will understand that it is a request from the UE to activate the SCG. However, each of Option 1 and Option 2 has their drawback, wherein Option 1 does not work in a case of a MCG failure, and in Option 2, the RA procedure might suffer from the handshake between a MN and the SN to approve the SCG activation.

To resolve the abovementioned problems, embodiments of the present application propose a method in combination of Option 1 and Option 2 and introduce new timer(s) for the RA procedure towards a deactivated SCG, to better support a UE triggered SCG activation procedure. In some embodiments, a UE firstly tries to send a SCG activation request via a MCG, and if a MCG failure occurs, the UE triggers a RA procedure via a SCG. In some further embodiments, a UE might indicate a MCG failure in a RA message which is sent to a SN; and then, a SN or a MN shall not reject the SCG activation procedure due to the MCG failure. In some other embodiments, new timers are introduced to support the RA procedure under a deactivated state of a SCG, to survive a delay due to a handshake between a MN and a SN to approve the UE triggered SCG activation procedure. More details will be illustrated in the following text in combination with the appended drawings.

According to 3GPP standard documents, two types of random access (RA) procedures are supported: 4-step RA type with message 1 (i.e., MSG1, MSG.1, or the like), message 2 (i.e., MSG2, MSG.2, or the like), message 3 (i.e., MSG3, MSG.3, or the like), and message 4 (i.e., MSG4, MSG.4, or the like); and 2-step RA type with message 0 (i.e., MSG0, MSG.0, or the like), message A (i.e., MSGA, MSG.A, or the like), and message B (i.e., MSGB, MSG.B, or the like). Both types of RA procedures support contention-based random access (CBRA) and contention-free random access (CFRA). Details are described in FIGS. 2-5.

Figure 2:
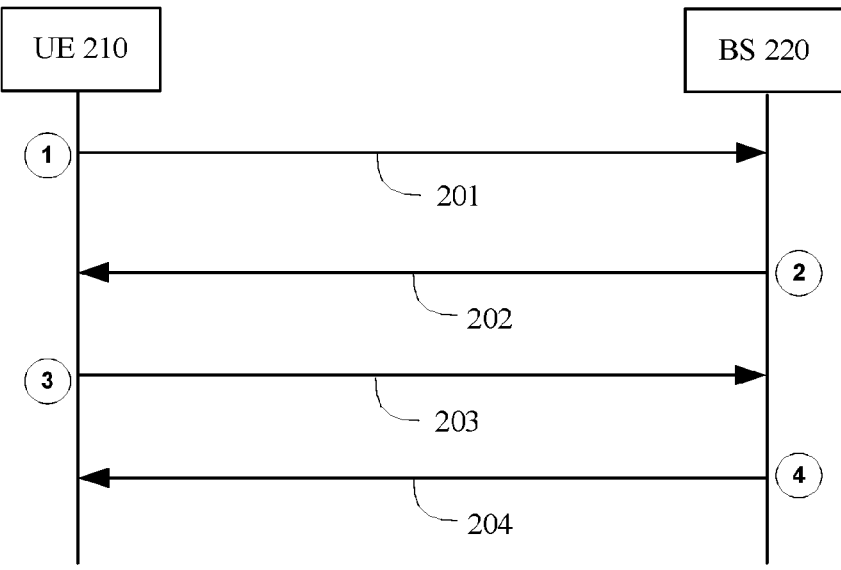
FIG. 2 is a contention-based random access (CBRA) procedure with 4-step random access (RA) type according to some embodiments of the present application.

FIG. 2 is a contention-based random access (CBRA) procedure with 4-step random access (RA) type according to some embodiments of the present application. The embodiments of FIG. 2 show a procedure of a UE (e.g., UE 210) communicating with a base station (e.g., BS 220). In some examples, UE 210 may function as UE 101 in FIG. 1. BS 220 may function as MN 102 or SN 103 in FIG. 1. In the embodiments of FIG. 2, four steps of the CBRA procedure are:

(1) In operation 201, UE 210 transmits Random Access Preamble via message 1 (i.e., MSG1, MSG.1, Msg1, Msg.1, or the like) to BS 220.

(2) In operation 202, UE 210 receives Random Access Response via message 2 (i.e., MSG2, MSG.2, Msg2, Msg.2, or the like) from BS 220.

(3) In operation 203, UE 210 transmits message 3 (i.e., MSG3, MSG.3, Msg3, Msg.3, or the like) to the serving cell of BS 220:

a) For initial access procedure:
    1) UE 210 conveys the RRC Connection Request which is generated by the RRC layer and transmitted via a common control channel (CCCH).

b) For RRC Connection Re-establishment procedure:
    1) UE 210 conveys the RRC Connection Re-establishment Request which is generated by the RRC layer and transmitted via CCCH.

c) In the procedure to resume the RRC connection:
    1) UE 210 conveys the RRC Connection Resume Request which is generated by the RRC layer and transmitted via CCCH.
    2) UE 210 conveys a Resume identify (ID) to resume the RRC connection state.

(4) In operation 204, UE 210 receives message 4 (i.e., MSG4, MSG.4, Msg4, Msg.4, or the like) from BS 220 for a contention resolution purpose.

Figure 3:
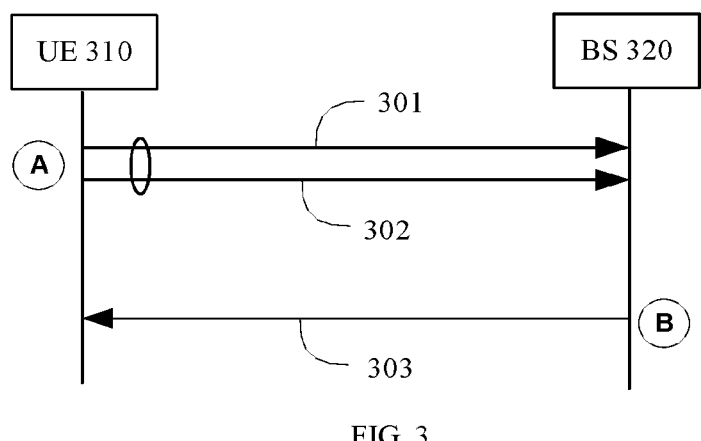
FIG. 3 is a CBRA procedure with 2-step RA type according to some embodiments of the present application.

FIG. 3 is a CBRA procedure with 2-step RA type according to some embodiments of the present application. The embodiments of FIG. 3 show a procedure of a UE (e.g., UE 310) communicating with a base station (e.g., BS 320). In some examples, UE 310 may function as UE 101 in FIG. 1. BS 320 may function as MN 102 or SN 103 in FIG. 1.

In the embodiments of FIG. 3, message A (i.e., MSGA, MSG.A, MsgA, Msg.A, or the like) of the 2-step RA type includes a preamble on PRACH (Physical Random Access Channel) and a payload on a physical uplink shared channel (PUSCH).

After MSGA is transmitted to BS 320 in operations 301 and 302, UE 310 monitors a response from BS 320 (i.e., a network response). For CBRA, if a contention resolution is successful upon receiving the response from BS 320, UE 310 ends the RA procedure.

In operation 303, if a fallback indication is received in message B (i.e., MSGB, MSG.B, MsgB, Msg.B, or the like) from BS 320, UE 310 performs MSG3 transmission using a UL grant which is scheduled in the fallback indication and monitors a contention resolution. If the contention resolution is not successful after MSG3 (re)transmission(s), UE 310 goes back to MSGA transmission.

Figure 4:
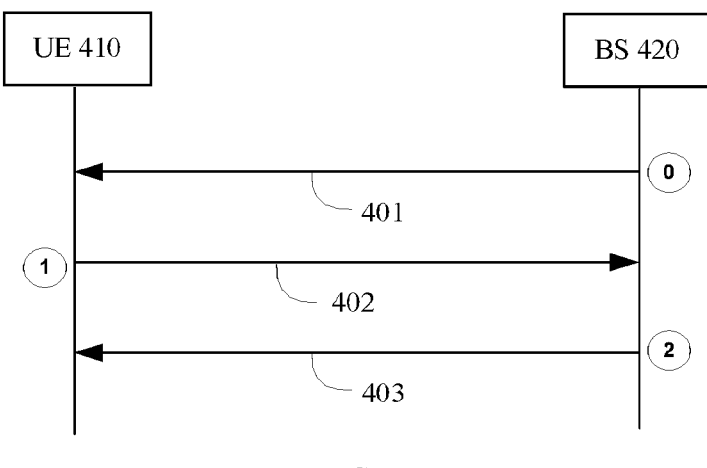
FIG. 4 is a contention-free random access (CFRA) procedure with 4-step RA type according to some embodiments of the present application.

FIG. 4 is a contention-free random access (CFRA) procedure with 4-step RA type according to some embodiments of the present application. The embodiments of FIG. 4 show a procedure of a UE (e.g., UE 410) communicating with a base station (e.g., BS 420). In some examples, UE 410 may function as UE 101 in FIG. 1. BS 420 may function as MN 102 or SN 103 in FIG. 1. In the embodiments of FIG. 4, three steps of the CFRA procedure are:

(1) In operation 401, UE 410 receives RA preamble assignment via message 0 (i.e., MSG0, MSG.0, Msg0, Msg.0, or the like) from BS 420.

(2) In operation 402, UE 410 transmits Random Access Preamble via message 1 (i.e., MSG1, MSG.1, Msg1, Msg.1, or the like) to BS 420.

(3) In operation 403, UE 410 receives Random Access Response via message 2 (i.e., MSG2, MSG.2, Msg2, Msg.2, or the like) from BS 420.

Figure 5:
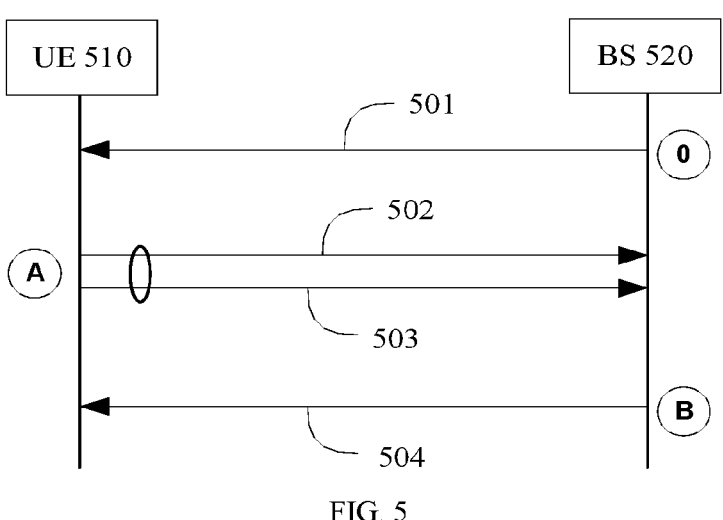
FIG. 5 is a CFRA procedure with 2-step RA type according to some embodiments of the present application.

FIG. 5 is a CFRA procedure with 2-step RA type according to some embodiments of the present application. The embodiments of FIG. 5 show a procedure of a UE (e.g., UE 510) communicating with a base station (e.g., BS 520). In some examples, UE 510 may function as UE 101 in FIG. 1. BS 520 may function as MN 102 or SN 103 in FIG. 1.

In the embodiments of FIG. 5, message A (i.e., MSGA, MSG.A, MsgA, Msg.A, or the like) of the 2-step RA type includes a preamble on PRACH and a payload on a PUSCH. In operation 501, UE 510 receives Random Access Preamble and PUSCH assignment via message 0 (i.e., MSG0, MSG.0, Msg0, Msg.0, or the like) from BS 520.

In operations 502 and 503, UE 510 transmits message A (i.e., MSGA, MSG.A, MsgA, Msg.A, or the like) of the 2-step RA type which includes Random Access Preamble and PUSCH payload. After MSGA is transmitted to BS 520 in operations 502 and 503, UE 510 monitors a response from BS 520 (i.e., a network response). For CFRA, a dedicated preamble and a PUSCH resource are configured for MSGA transmission, and upon receiving the response from BS 520, UE 510 ends the RA procedure.

In operation 504, if a fallback indication is received in message B (i.e., MSGB, MSG.B, MsgB, Msg.B, or the like) from BS 520, UE 510 performs MSG3 transmission using a UL grant which is scheduled in the fallback indication and monitors a contention resolution. If the contention resolution is not successful after MSG3 (re)transmission(s), UE 510 goes back to MSGA transmission.

FIG. 6 illustrates an exemplary flow chart of a method for triggering a RA procedure to a SN according to some embodiments of the present application.

The exemplary method 600 illustrated in FIG. 6 may be implemented by a UE (e.g., UE 101, UE 210, UE 310, UE 410, UE 510, or UE 910 as illustrated and shown in FIGS. 1-5 and 9, respectively). Although described with respect to a UE, it should be understood that other devices may be configured to perform a method similar to that of FIG. 6. The embodiments of FIG. 6 assume that a MN or a SN may be combined in any one of EN-DC, NGEN-DC, NE-DC, and NR-DC scenarios.

As shown in FIG. 6, in operation 601, a UE (e.g., UE 101 as illustrated and shown in FIG. 1) decides whether to activate a SCG associated with a SN (e.g., SN 103 as illustrated and shown in FIG. 1), and the SCG has been deactivated. In operation 602, in response to deciding to activate the SCG, the UE may trigger a RA procedure to the SN. The RA procedure may be associated with a PSCell of the SN.

In some embodiments, the UE further determines whether a time alignment timer (TAT) associated with the SCG is expired. If the TAT is expired and if the UE decides to activate the SCG, the UE may trigger the RA procedure.

In some further embodiments, the UE further determines whether a MCG failure occurs. If the UE decides to activate the SCG and the UE determines that no MCG failure occurs, the UE may transmit SCG activation indication information to a MN. The SCG activation indication information may be carried by a radio resource control (RRC) message and/or a medium access control (MAC) control element (CE). If a failure occurs during the UE transmitting the SCG activation indication information, the UE may determine that a MCG failure occurs.

In an embodiment, if the UE determines that a MCG failure occurs and the UE decides to activate the SCG, the UE may trigger the RA procedure. Specific examples are described in FIG. 9 and Embodiments 1-3 as follows.

In a further embodiment, if the UE determines that a MCG failure occurs, the UE may trigger a procedure to re-establish a RRC connection to a MN. For example, in some cases, when a SCG is deactivated, upon detecting a MCG failure, the UE may transmit a request message to trigger a procedure to re-establish a RRC connection to the MN. That is, when a MCG failure occurs, the UE may directly trigger a RRC connection re-establishment procedure to the MN in case of deactivated SCG.

In another embodiment, if the UE determines that a MCG failure occurs, the UE generates MCG failure indication information. In an embodiment, the MCG failure indication information in the RA request message includes: a cause of the MCG failure; one or more measurement results of the UE; and/or an indicator indicating the MCG failure. For instance, the MCG failure indication information is included in at least one of following messages:

(1) A RA request message in a 4-step RA procedure. For instance, the RA request message may be:

a) MSG1 in a 4-step RA procedure (e.g., MSG1 containing Random Access Preamble in CBRA/CFRA 4-step RA procedure); or b) MSG3 in CBRA with a 4-step RA procedure (e.g., Msg3 containing Scheduled Transmission in CBRA 4-step RA procedure).

(2) A RA request message in a 2-step RA procedure. For instance, the RA request message may be MSGA in a 2-step RA procedure (e.g., MsgA containing Random Access Preamble and PUSCH payload in CBRA/CFRA 2-step RA procedure).

(3) An uplink (UL) RRC message.

In particular, in some embodiments, the UE may include the whole MCG failure indication information in MSG1, MSG3, or MSGA. In some other embodiments, the UE first determines a size of the whole MCG failure indication information. Only if the size of the whole MCG failure indication information does not exceed a certain value, e.g., 50 bits, the UE is allowed to include the whole MCG failure indication information in MSG1, MSG3, or MSGA. If the size of the MCG failure indication information exceeds a certain value, in one option, the UE does not include any MCG failure indication information in MSG3 or MSGA; or in another option, the UE only includes a part of the MCG failure indication information of the certain size in MSG3 or MSGA, and then, the UE sends the rest of the MCG failure indication information later via a UL RRC message transmission.

In some embodiments, during triggering the RA procedure in operation 602, the UE transmits a RA request message to the SN. In some cases, the SN cannot reject the RA request message from the UE. Then, the UE receives a RA response message from the SN, and the RA response message includes an indicator regarding a completion of the RA procedure. The RA request message transmitted by the UE may include MCG failure indication information, which may include at least one of: a cause of a MCG failure; measurement result(s) of the UE; and/or an indicator indicating the MCG failure. For example, a size of the MCG failure indication information in the RA request message does not exceed a threshold value.

In some embodiments, the UE further determines whether a SCG failure occurs. In an embodiment, if the UE fails to complete a RA procedure to a SN, the UE determines that a SCG failure occurs. If the UE determines that a SCG failure occurs, the UE may generate SCG failure indication information and transmits the SCG failure indication information to a MN. Specifically, in these embodiments, if a UE triggers a SCG activation procedure due to UL data arrival, but the UE determines a SCG activation failure due to a SCG link failure (e.g., a RA procedure between the UE and the SN fails), the UE may generate SCG failure indication information and sends the generated SCG failure indication information to a MN via, e.g., a MCG RRC message. For example, the SCG failure indication information includes: a cause of the SCG failure (e.g., the UE fails to activate SCG due to UL data arrival); information relating to a data radio bearer (DRB) (e.g., a DRB identity); and/or an indicator indicating the SCG failure.

Details described in the embodiments as illustrated and shown in FIGS. 1-5 and 7-15, especially, contents related to specific operations of a UE triggered SCG activation procedure, are applicable for the embodiments as illustrated and shown in FIG. 6. Moreover, details described in the embodiments of FIG. 6 are applicable for all the embodiments of FIGS. 1-5 and 7-15.

FIG. 7 illustrates an exemplary flow chart of a method for receiving MCG failure indication information according to some embodiments of the present application.

The method illustrated in FIG. 7 may be implemented by a RAN node (e.g., SN 103, BS 220, BS 320, BS 420, BS 520, or SN 930 as shown and illustrated in FIGS. 1-5 and 9, respectively). Although described with respect to a RAN node, e.g., a SN, it should be understood that other devices may be configured to perform a method similar to that of FIG. 7.

In the exemplary method 700 as shown in FIG. 7, in operation 701, a SN (e.g., SN 103 as illustrated and shown in FIG. 1) receives, from a UE (e.g., UE 101 as illustrated and shown in FIG. 1), a message including MCG failure indication information. In some embodiments, the MCG failure indication information includes at least one of: a cause of the MCG failure; one or more measurement results of the UE; and an indicator indicating the MCG failure.

In some embodiments, the message including the MCG failure indication information is a RA request message and/or an uplink RRC message. The RA request message may be associated with a 4-step RA procedure and/or a 2-step RA procedure. In some cases, the SN cannot reject the RA request message from the UE. For example, a size of the MCG failure indication information in the RA request message does not exceed a threshold value, e.g., a certain value "50 bits".

In operation 702, the SN transmits, to a MN (e.g., MN 102 as illustrated and shown in FIG. 1), a further message including the MCG failure indication information. In other words, the SN forwards the MCG failure indication information, which is received from the UE, to the MN. In some embodiments, the further message includes an indicator regarding a completion of a RA procedure; and/or a completion of a SCG activation procedure. In some embodiments, the further message is a SN modification required message; and/or a secondary gNB (SgNB) modification required message.

In some embodiments, the SN further transmits a RA response message to the UE, and the RA response message includes an indicator regarding a completion of a RA procedure. In some other embodiments, the SN receives another message, which includes modified configuration information, from the MN. The abovementioned another message may be a SN modification confirm message and/or a SgNB modification confirm message. Specific examples are described in FIG. 9 and Embodiments 1-3 as follows.

Details described in the embodiments as illustrated and shown in FIGS. 1-6 and 8-15, especially, contents related to specific operations of a UE triggered SCG activation procedure, are applicable for the embodiments as illustrated and shown in FIG. 7. Moreover, details described in the embodiments of FIG. 7 are applicable for all the embodiments of FIGS. 1-6 and 8-15.

FIG. 8 illustrates a further exemplary flow chart of a method for receiving MCG failure indication information according to some embodiments of the present application.

The method illustrated in FIG. 8 may be implemented by a RAN node (e.g., MN 102, BS 220, BS 320, BS 420, BS 520, or MN 920 as shown and illustrated in FIGS. 1-5 and 9, respectively). Although described with respect to a RAN node, e.g., a MN, it should be understood that other devices may be configured to perform a method similar to that of FIG. 8.

In the exemplary method 800 as shown in FIG. 8, in operation 801, a MN (e.g., MN 102 as illustrated and shown in FIG. 1) receives, from a SN (e.g., SN 103 as illustrated and shown in FIG. 1), a message including MCG failure indication information. In some embodiments, the MCG failure indication information includes at least one of: a cause of the MCG failure; one or more measurement results of the UE; and an indicator indicating the MCG failure.

In some embodiments, the message including the MCG failure indication information includes an indicator regarding a completion of a RA procedure; and a completion of a SCG activation procedure. For instance, the message is a SN modification required message; and/or a SgNB modification required message. In some cases, the MN cannot reject the message including the MCG failure indication information received from the SN.

In operation 802, the MN transmits, to the SN, a further message including modified configuration information. In some embodiments, the further message is a SN modification confirm message; and/or a SgNB modification confirm message. Specific examples are described in FIG. 9 and Embodiments 1-3 as follows.

In some embodiments, the MN further receives, from a UE (e.g., UE 101 as illustrated and shown in FIG. 1), a request message to re-establish a RRC connection. For example, upon the UE detecting a MCG failure when a SCG is deactivated, the UE transmits a request message to trigger a procedure to re-establish a RRC connection to the MN.

Details described in the embodiments as illustrated and shown in FIGS. 1-7 and 9-15, especially, contents related to specific operations of a UE triggered SCG activation procedure, are applicable for the embodiments as illustrated and shown in FIG. 8. Moreover, details described in the embodiments of FIG. 8 are applicable for all the embodiments of FIGS. 1-7 and 9-15.

Figure 9:
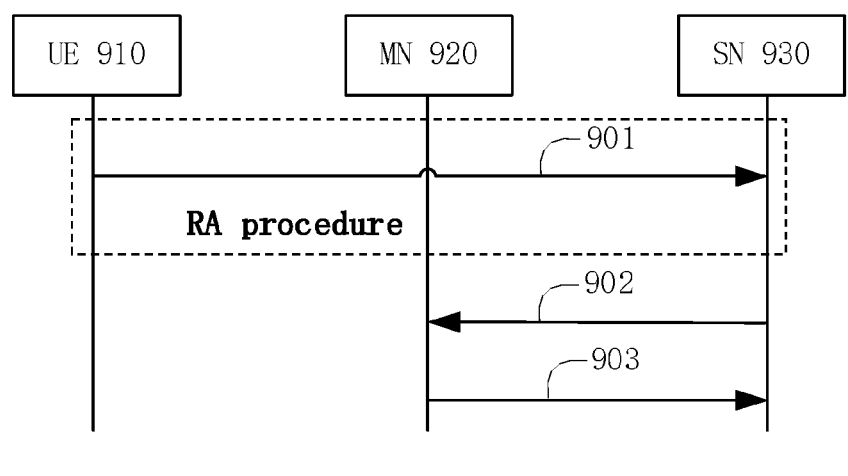
FIG. 9 illustrates an exemplary flow chart of a SCG activation procedure via a RA procedure due to a MCG failure according to some embodiments of the present application.

FIG. 9 illustrates an exemplary flow chart of a SCG activation procedure via a RA procedure due to a MCG failure according to some embodiments of the present application.

As shown in FIG. 9, in operation 901, UE 910 (e.g., UE 101 as illustrated and shown in FIG. 1) triggers a RA procedure to SN 930 (e.g., SN 103 as illustrated and shown in FIG. 1), e.g., a RA procedure towards a PSCell of SN 930. After completing the RA procedure, in operation 902, SN 930 transmits a SN modification required message and/or a SgNB modification required message to MN 930 (e.g., MN 102 as illustrated and shown in FIG. 1). In operation 903, MN 930 transmits a SN modification confirm message and/or a SgNB modification confirm message to SN 930.

Specifically, the embodiments of FIG. 9 may be performed in different scenarios. The following texts describe specific Embodiments 1-3 of the method as shown and illustrated in FIG. 9.

Embodiment 1

Embodiment 1 assumes that UE 910 has not detected a MCG failure. According to Embodiment 1, UE 910 may want to activate a deactivated SCG. In this embodiment, UE 910 aiming to activate a SCG is not because of a MCG failure detection. It is different from following Embodiment 2, in which UE 910 aiming to activate the SCG is because of a MCG failure detection and a fast MCG link recovery detection.

In Embodiment 1, when UE 910 wants to activate a deactivated SCG due to, e.g., an UL data arrival at SCG DRBs, and a MCG transmission is not suspended, UE 910 checks whether a TAT associated with the deactivated SCG is expired or not:

(1) If the TAT associated with the deactivated SCG is not expired, UE 910 starts transmitting packet(s) to SN 930 in an uplink.

(2) If the TAT associated with the deactivated SCG is expired, UE 910 generates a RRC message or a MAC CE message containing an indication of UE 910 triggered SCG activation procedure, and UE 910 sends the RRC message or the MAC CE message to MN 920. If the transmission of MCG RRC message indicating UE 910 triggered SCG activation procedure fails, UE 910 initiates a RA procedure to a PSCell of SN 930.

1) In operation 901 of Embodiment 1, during the RA procedure to the PSCell of SN 930, UE 910 transmits a message including an indicator indicating the MCG failure (i.e., MCG failure indication information) to SN 930. SN 930 cannot reject the message from UE 910. For example, UE 910 may include the MCG failure indication information in any one of following RA request message sent from UE 910 to the PSCell: MSG1 in 4-step RA procedure; MSG3 in CBRA with 4-step RA procedure; and/or MSG A in 2-step RA procedure. All contents regarding the MCG failure indication information described in the abovementioned embodiments are applicable for Embodiment 1. For instance, the MCG failure indication information may include a cause of the MCG failure and the relevant measurement results.

2) In operation 902 of Embodiment 1, a SN modification required message and/or a SgNB modification required message transmitted from SN 930 to MN 930 may include the MCG failure indication information received from UE 910. In other words, SN 930 forwards the MCG failure indication information received from UE 910 to MN 930. MN 930 cannot reject the SN modification required message and/or the SgNB modification required message from SN 930.

3) In operation 903 of Embodiment 1, a SN modification confirm message and/or a SgNB modification confirm message transmitted from MN 930 to SN 930 includes modified configuration information.

Embodiment 2

Embodiment 2 assumes that UE 910 has detected a MCG failure and a fast MCG link recovery is configured. The MCG failure could be caused by the poor link condition between UE 910 and MN 930. In Embodiment 2, When SCG is deactivated and UE 910 needs to activate the SCG, UE 910 checks whether a TAT associated with the deactivated SCG is expired or not:

(1) If the TAT associated with the deactivated SCG is not expired, UE 910 resumes or activates the SCG transmission and transmits the generated MCG failure indication information via the SCG to MN 920. The MCG failure indication information may include a cause of the MCG failure and the relevant measurement results.

(2) If the TAT associated with the deactivated SCG is expired, UE 910 initiates a RA procedure to the PSCell of SN 930, and may include an indicator indicating MCG failure (i.e., MCG failure indication information) in any one of the following RA request message sent from UE 910 to the PSCell: MSG1 in 4-step RA procedure; MSG3 in a CBRA with 4-step RA procedure; and/or MSG A in 2-step RA procedure.

In Embodiment 2, when SN 930 of the deactivated PSCell receives the RA message indicating the MCG failure from UE 910, SN 930 shall not reject the RA request (and equivalently a SCG activation request) in operation 901. SN 930 responds the RA request and completes the RA procedure, and then, SN 930 informs MN 920 about the completeness of RA procedure and the SCG activation procedure due to the MCG failure via Xn or X2 interface (e.g., SN MODIFICATION REQUIRED, or SGNB MODIFICATION REQUIRED message) in operation 902. Similarly, when MN 920 understands from SN 930 that the SCG activation procedure is due to a MCG failure, MN 920 shall not reject the SCG activation procedure.

In Embodiment 2, the message sent from SN 930 to MN 920 to inform the completeness of the RA procedure and the SCG activation procedure may contain any or a combination of the following:

(1) Completeness of the RA procedure;
(2) Completeness of SCG activation procedure;
(3) A MCG failure indicator; and/or
(4) MCG failure indication information.

Embodiment 3

According to Embodiment 3, a network shall not reject UE 910 activation request via a RA procedure. In Embodiment 3, when a SCG of SN 930 is deactivated, if UE 910 starts a RA procedure towards a PSCell regardless of a MCG failure or not, SN 930 shall not reject the RA request message or a SCG activation request from UE 910. After finishing the RA procedure, SN 930 informs MN 920 about the completeness of UE 910 triggered RA procedure and a SCG activation procedure.

In particular, in operation 902 of Embodiment 3, a SN modification required message and/or a SgNB modification required message transmitted from SN 930 to MN 930 may include an indicator indicating a completeness of UE 910 triggered RA procedure and the SCG activation procedure. MN 930 shall not reject the message in operation 902. In operation 903 of Embodiment 3, a SN modification confirm message and/or a SgNB modification confirm message transmitted from MN 930 to SN 930 includes modified configuration information.

Figure 10:
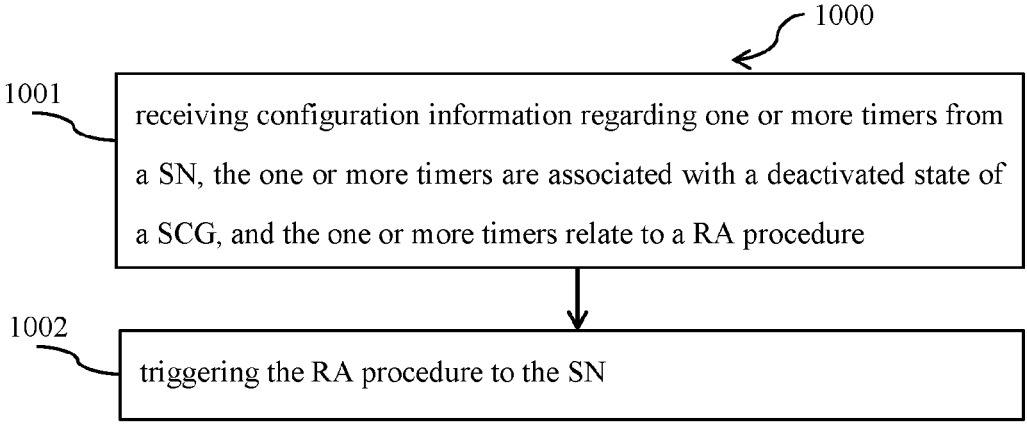
FIG. 10 illustrates an exemplary flow chart of a method for receiving configuration information regarding timer(s) relating to a RA procedure according to some embodiments of the present application.

FIG. 10 illustrates an exemplary flow chart of a method for receiving configuration information regarding timer(s) relating to a RA procedure according to some embodiments of the present application.

The exemplary method 1000 illustrated in FIG. 10 may be implemented by a UE (e.g., UE 101, UE 210, UE 310, UE 410, UE 510, UE 910, US 1210, US 1310, or US 1410 as illustrated and shown in FIGS. 1-5, 9, and 12-14, respectively). Although described with respect to a UE, it should be understood that other devices may be configured to perform a method similar to that of FIG. 10. The embodiments of FIG. 10 assume that a MN or a SN may be combined in any one of EN-DC, NGEN-DC, NE-DC, and NR-DC scenarios.

As shown in FIG. 10, in operation 1001, a UE (e.g., UE 101 as illustrated and shown in FIG. 1) receives configuration information regarding one or more timers from a SN. The one or more timers are associated with a deactivated state of a SCG. The one or more timers relate to a RA procedure. In operation 1002, the UE triggers the RA procedure to the SN. The RA procedure may be associated with a primary cell of a second cell group (PSCell) of the SN. In some embodiments, the RA procedure is a 4-step RA procedure; and/or a 2-step RA procedure. In some embodiments, the UE further transmits a RA request message to the SN.

In the embodiments of FIG. 10, after the SN receives the RA request message from the UE and identifies the UE (e.g., Msg1 in 4-Step CFRA, Msg3 in 4-Step CBRA, MsgA in 2-Step RA, or UE specific RA resource), the SN needs to handshake with a MN before responding the UE's RA request message. In this case, timers used for a RA operation under the activated SCG could be too small to cover the latency caused by the handshake between the MN and the SN. Thus, new timers are needed to distinguish the RA operation under the deactivated SCG and the RA operation under the activated SCG.

In particular, when the SCG is deactivated, the RA procedure from the UE towards a PSCell adopts new timers to determine whether the RA procedure is successful or not. In some embodiments, a length of each timer within the one or more timers is larger than a length of a timer relating to the RA procedure, which is not associated with the deactivated state of the SCG (e.g., a legacy RA timer). In some embodiments, the one or more timers include at least one of following timers:

(1) a timer for monitoring a 4-step RA type response during a deactivated state of a SCG (e.g., it may be named as ra-ResponseWindowSCGDeactivated). This timer is a time window to monitor RA response(s) when a PSCell is currently deactivated.

(2) a timer for a contention resolution during a deactivated state of a SCG (e.g., it may be named as ra-ContentionResolutionTimerSCGDeactivated). This is a Contention Resolution Timer when a PSCell is currently deactivated.

(3) a timer for monitoring a 2-step RA type response during a deactivated state of a SCG (e.g., it may be named as ra-ResponseWindowSCGDeactivated). This timer is a time window to monitor RA response(s) for a 2-step RA type when a PSCell is currently deactivated.

In some embodiments, the UE further transmits a random access preamble and/or an index of the random access preamble to the SN. Upon transmitting the random access preamble and/or the index of the random access preamble, the UE may start the timer for monitoring the 4-step RA type response (e.g., ra-ResponseWindowSCGDeactivated). In an embodiment, if this timer is expired, the UE may determine that the RA procedure and a SCG activation procedure are not successful. In a further embodiment, the UE further receives a RA response message from the SN, and the RA response message includes a random access preamble identifier that matches the random access preamble and/or the index of the random access preamble. Upon receiving the RA response message, the UE may stop this timer (e.g., ra-ResponseWindowSCGDeactivated).

In some further embodiments, the UE further transmits a scheduled transmission message (e.g., MSG3) to the SN. Upon transmitting the scheduled transmission message, the UE may start the timer for the contention resolution (e.g., ra-ContentionResolutionTimerSCGDeactivated). In an embodiment, if this timer is expired, the UE may determine that the RA procedure and the SCG activation procedure are not successful. In an embodiment, the UE further receives a contention resolution message (e.g., MSG4) for a cell radio network temporary identifier (C-RNTI) associated with the UE; and upon receiving the contention resolution message, the UE may stop the timer for the contention resolution (e.g., ra-ContentionResolutionTimerSCGDeactivated).

In some other embodiments, the UE further transmits a random access preamble with a 2-step RA type (e.g., MsgA preamble) to the SN. Upon transmitting the random access preamble with the 2-step RA type, the UE may start the timer for monitoring the 2-step RA type response (e.g., msgB-ResponseWindowSCGDeactivated). In an embodiment, if this timer is expired, the UE may determine that the RA procedure and a SCG activation procedure are not successful. In a further embodiment, if the UE receives a physical downlink control channel (PDCCH) transmission associated with the UE and/or a downlink assignment for a C-RNTI associated with the UE, the UE stops the timer for monitoring the 2-step RA type response. Specific examples are described in FIGS. 12-14 as follows.

Details described in the embodiments as illustrated and shown in FIGS. 1-9 and 11-15, especially, contents regarding timer(s) relating to a RA procedure, are applicable for the embodiments as illustrated and shown in FIG. 10. Moreover, details described in the embodiments of FIG. 10 are applicable for all the embodiments of FIGS. 1-9 and 11-15.

Figure 11:
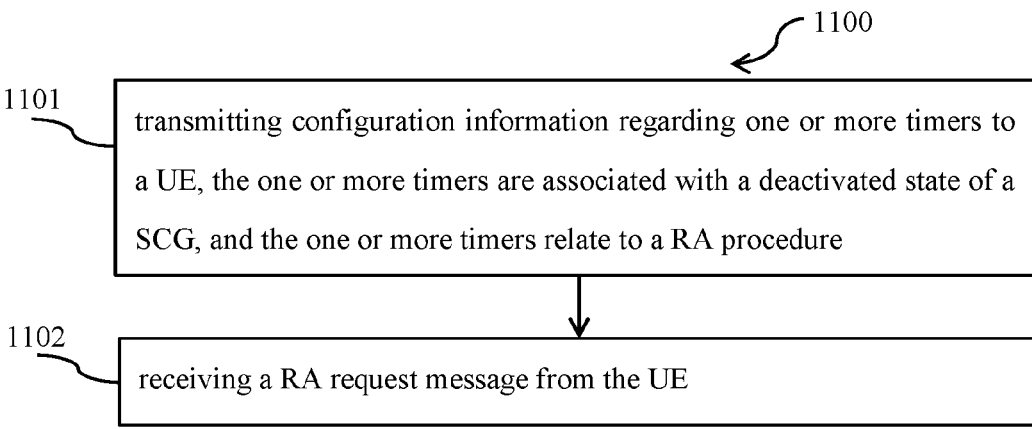
FIG. 11 illustrates a further exemplary flow chart of a method for transmitting configuration information regarding timer(s) relating to a RA procedure according to some embodiments of the present application.

FIG. 11 illustrates a further exemplary flow chart of a method for transmitting configuration information regarding timer(s) relating to a RA procedure according to some embodiments of the present application.

The method illustrated in FIG. 11 may be implemented by a RAN node (e.g., SN 103, BS 220, BS 320, BS 420, BS 520, SN 930, SN 1220, SN 1320, or SN 1420 as shown and illustrated in FIGS. 1-5, 9, and 12-14, respectively). Although described with respect to a RAN node, e.g., a SN, it should be understood that other devices may be configured to perform a method similar to that of FIG. 11.

In the exemplary method 1100 as shown in FIG. 11, in operation 1101, a SN (e.g., SN 103 as illustrated and shown in FIG. 1) transmits configuration information regarding one or more timers to a UE (e.g., UE 101 as illustrated and shown in FIG. 1). The one or more timers are associated with a deactivated state of a SCG and relate to a RA procedure. The RA procedure may be associated with a primary cell of a second cell group (PSCell) of the SN. In some embodiments, the RA procedure is a 4-step RA procedure; and/or a 2-step RA procedure. In operation 1102, the SN receives a RA request message from the UE.

In some embodiments, a length of each timer within the one or more timers is larger than a length of a timer relating to the RA procedure not associated with the deactivated state of the SCG (e.g., a legacy RA timer). In some embodiments, the one or more timers include at least one of:

(1) a timer for monitoring a 4-step RA type response during a deactivated state of a SCG (e.g., it may be named as ra-ResponseWindowSCGDeactivated).

(2) a timer for a contention resolution during a deactivated state of a SCG (e.g., it may be named as ra-ContentionResolutionTimerSCGDeactivated).

(3) a timer for monitoring a 2-step RA type response during a deactivated state of a SCG (e.g., it may be named as ra-ResponseWindowSCGDeactivated).

In some embodiments, the SN further receives a random access preamble and/or an index of the random access preamble from the UE. A timer for monitoring the 4-step RA type response (e.g., ra-ResponseWindowSCGDeactivated) is started upon the UE transmitting the random access preamble and/or the index of the random access preamble. In an embodiment, if this timer is expired, the UE may determine that the RA procedure and a SCG activation procedure are not successful. In a further embodiment, the SN further transmits a RA response message to the UE, and the RA response message includes a random access preamble identifier that matches the random access preamble and/or the index of the random access preamble. Upon the UE receiving the RA response message, this timer (e.g., ra-ResponseWindowSCGDeactivated) may be stopped.

In some further embodiments, the SN further receives a scheduled transmission message (e.g., MSG3) from the UE, and a timer for the contention resolution (e.g., ra-ContentionResolutionTimerSCGDeactivated) is started upon the UE transmitting the scheduled transmission message. In an embodiment, if this timer is expired, the RA procedure and a SCG activation procedure are considered as not successful.

In some other embodiments, the SN further transmits, to the UE, a contention resolution message (e.g., MSG4) for a C-RNTI associated with the UE. Upon the UE receiving the contention resolution message, the timer for the contention resolution (e.g., ra-ContentionResolutionTimerSCGDeactivated) is stopped.

In some additional embodiments, the SN further receives a random access preamble with a 2-step RA type (e.g., MSGA preamble) from the UE. A timer for monitoring the 2-step RA type response (e.g., msgB-ResponseWindowSCGDeactivated) is started upon the UE transmitting the random access preamble with the 2-step RA type. In an embodiment, if this timer (e.g., msgB-ResponseWindowSCGDeactivated) is expired, the RA procedure and a SCG activation procedure are considered as not successful.

In some other embodiments, the SN further transmits, to the UE, a PDCCH transmission associated with the UE or a downlink assignment for a C-RNTI associated with the UE. The timer for monitoring the 2-step RA type response (e.g., msgB-ResponseWindowSCGDeactivated) may be stopped upon the UE receiving the PDCCH transmission or the downlink assignment. Specific examples are described in FIGS. 12-14 as follows.

Details described in the embodiments as illustrated and shown in FIGS. 1-10 and 12-15, especially, contents regarding timer(s) relating to a RA procedure, are applicable for the embodiments as illustrated and shown in FIG. 11. Moreover, details described in the embodiments of FIG. 11 are applicable for all the embodiments of FIGS. 1-10 and 12-15.

Figure 12:
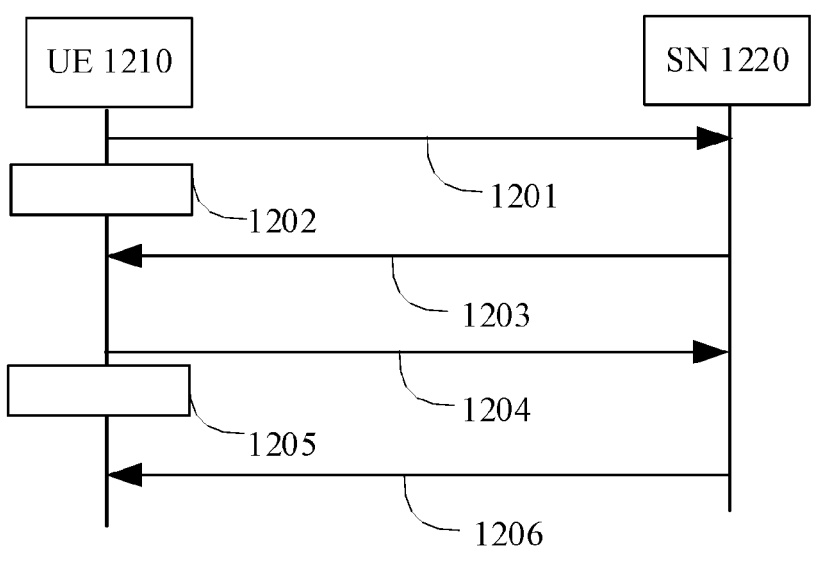
FIG. 12 illustrates an exemplary flow chart of a new timer in 4-step CBRA procedure when a SCG is deactivated according to some embodiments of the present application.

FIG. 12 illustrates an exemplary flow chart of a new timer in 4-step CBRA procedure when a SCG is deactivated according to some embodiments of the present application.

As shown in FIG. 12, in operation 1201, UE 1210 (e.g., UE 101 as illustrated and shown in FIG. 1) transmits a message (e.g., MSG1) containing a RA preamble (e.g., PREAMBLE INDEX) to SN 1220 (e.g., SN 103 as illustrated and shown in FIG. 1). In operation 1202, once the RA preamble is transmitted, UE 1210 starts timer ra-ResponseWindowSCGDeactivated. If timer ra-ResponseWindowSCGDeactivated expires, the RA procedure and the SCG activation procedure are considered as not successful.

In operation 1203, SN 1220 transmits a message (e.g., MSG2) containing a RA response to UE 1210. In an embodiment, timer ra-ResponseWindowSCGDeactivated stops if UE 1210 receives the RA response containing a RA preamble identifier that matches PREAMBLE INDEX transmitted in operation 1201.

In operation 1204, UE 1210 transmits a message (e.g., MSG3) to SN 1220. In operation 1205, once the message (e.g., MSG3) is transmitted, UE 1210 starts timer ra-ContentionResolutionTimerSCGDeactivated and restarts timer ra-ContentionResolutionTimerSCGDeactivated at each HARQ retransmission. If timer ra-ContentionResolutionTimerSCGDeactivated expires, the RA procedure and the SCG activation procedure are considered not successful.

In operation 1206, SN 1220 transmits a message (e.g., MSG4) to UE 1210. Timer ra-ContentionResolutionTimerSCGDeactivated stops, if UE 1210 receives the message (e.g., MSG4) from NW for a C-RNTI associated with the UE.

Details described in the embodiments as illustrated and shown in FIGS. 1-11 and 13-15, especially, contents regarding timer(s) relating to a RA procedure, are applicable for the embodiments as illustrated and shown in FIG. 12.

Moreover, details described in the embodiments of FIG. 12 are applicable for all the embodiments of FIGS. 1-11 and 13-15.

Figure 13:
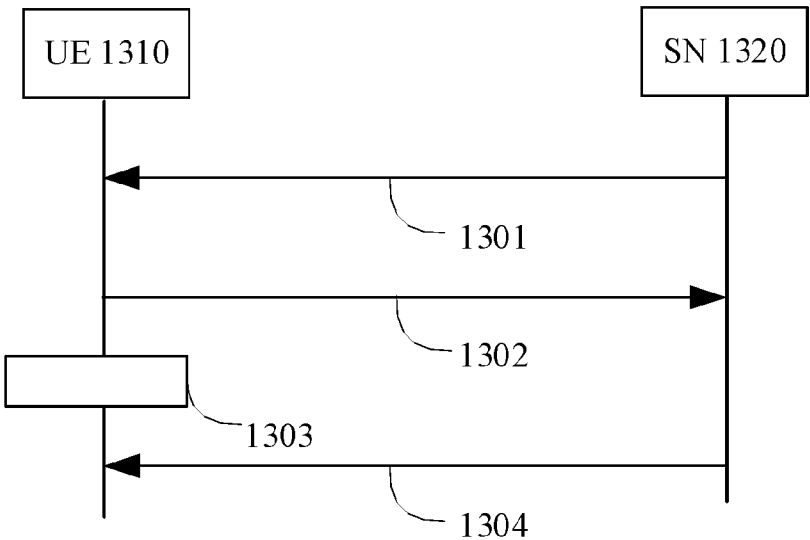
FIG. 13 illustrates an exemplary flow chart of a new timer in 4-step CFRA procedure when a SCG is deactivated according to some embodiments of the present application.

FIG. 13 illustrates an exemplary flow chart of a new timer in 4-step CFRA procedure when a SCG is deactivated according to some embodiments of the present application.

As shown in FIG. 13, in operation 1301, SN 1320 (e.g., SN 103 as illustrated and shown in FIG. 1) transmits a message containing a RA preamble assignment to UE 1310 (e.g., UE 101 as illustrated and shown in FIG. 1). In operation 1302, UE 1310 transmits a message (e.g., MSG1) containing a RA preamble (e.g., PREAMBLE INDEX) to SN 1320. In operation 1303, once the RA preamble is transmitted, UE 1210 starts timer ra-ResponseWindowSCGDeactivated. If timer ra-ResponseWindowSCGDeactivated expires, the RA procedure and the SCG activation procedure are considered as not successful. In operation 1304, SN 1320 transmits a message (e.g., MSG2) containing a RA response to UE 1310. Timer ra-ResponseWindowSCGDeactivated stops if UE 1310 receives the RA response containing a RA preamble identifier that matches the transmitted PREAMBLE INDEX Details described in the embodiments as illustrated and shown in FIGS. 1-12, 14, and 15, especially, contents regarding timer(s) relating to a RA procedure, are applicable for the embodiments as illustrated and shown in FIG. 13. Moreover, details described in the embodiments of FIG. 13 are applicable for all the embodiments of FIGS. 1-12, 14, and 15.

Figure 14:
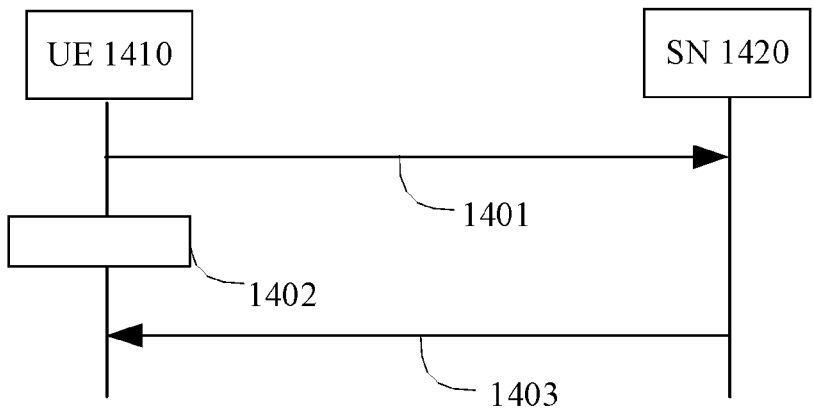
FIG. 14 illustrates an exemplary flow chart of a new timer in 2-step RA procedure when a SCG is deactivated according to some embodiments of the present application.

FIG. 14 illustrates an exemplary flow chart of a new timer in 2-step RA procedure when a SCG is deactivated according to some embodiments of the present application.

As shown in FIG. 14, in operation 1401, UE 1410 (e.g., UE 101 as illustrated and shown in FIG. 1 transmits a message (e.g., MSGA) to SN 1420 (e.g., SN 103 as illustrated and shown in FIG. 1). In operation 1402, once the message (e.g., MSGA) is transmitted, UE 1410 starts timer msgB-ResponseWindowSCGDeactivated. If timer msgB-ResponseWindowSCGDeactivated expires, the RA procedure and the SCG activation procedure are considered not successful. In operation 1403, SN 1420 transmits a message (e.g., MSGB) to UE 1410. Timer msgB-ResponseWindowSCGDeactivated stops if UE 1410 receives a PDCCH transmission or a downlink assignment for the C-RNTI associated with UE 1410.

Details described in the embodiments as illustrated and shown in FIGS. 1-13 and 15, especially, contents regarding timer(s) relating to a RA procedure, are applicable for the embodiments as illustrated and shown in FIG. 14. Moreover, details described in the embodiments of FIG. 14 are applicable for all the embodiments of FIGS. 1-13 and 15.

Figure 15:
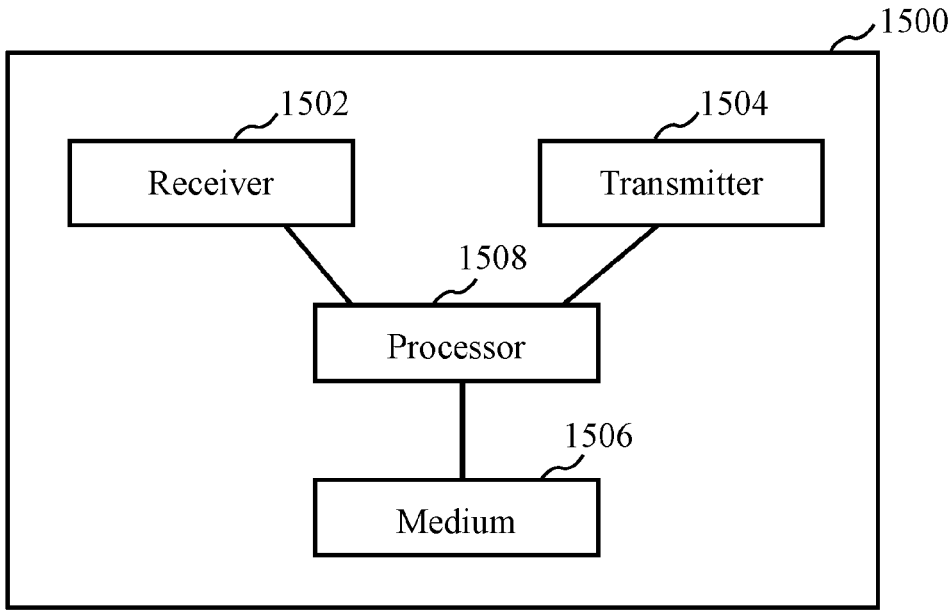
FIG. 15 illustrates an exemplary block diagram of an apparatus according to some embodiments of the present application.

FIG. 15 illustrates an exemplary block diagram of an apparatus according to some embodiments of the present application. In some embodiments of the present application, the apparatus 1500 may be a UE, which can at least perform any of the methods illustrated in FIGS. 6 and 10. In some embodiments of the present application, the apparatus 1500 may be a RAN node, e.g., a SN or a MN, which can at least perform the methods illustrated in FIGS. 7, 8, and 11.

As shown in FIG. 15, the apparatus 1500 may include at least one receiver 1502, at least one transmitter 1504, at least one non-transitory computer-readable medium 1506, and at least one processor 1508 coupled to the at least one receiver 1502, the at least one transmitter 1504, and the at least one non-transitory computer-readable medium 1506.

Although in FIG. 15, elements such as the at least one receiver 1502, the at least one transmitter 1504, the at least one non-transitory computer-readable medium 1506, and the at least one processor 1508 are described in the singular, the plural is contemplated unless limitation to the singular is explicitly stated. In some embodiments of the present application, the at least one receiver 1502 and the at least one transmitter 1504 are combined into a single device, such as a transceiver. In certain embodiments of the present application, the apparatus 1500 may further include an input device, a memory, and/or other components.

In some embodiments of the present application, the at least one non-transitory computer-readable medium 1506 may have stored thereon computer-executable instructions which are programmed to implement the operations of the methods, for example as described in view of any of FIGS. 6-9, with the at least one receiver 1502, the at least one transmitter 1504, and the at least one processor 1508.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A user equipment (UE) for wireless communication, comprising:
   at least one memory; and
   at least one processor coupled with the at least one memory and configured to cause the UE to:
      decide whether to activate a secondary cell group (SCG) associated with a secondary node (SN), wherein the SCG has been deactivated; and
      trigger, in response to deciding to activate the SCG, a random access (RA) procedure to the SN.

2. The UE of claim 1, wherein the at least one processor is configured to cause the UE to:
   determine whether a master cell group (MCG) failure occurs.

3. The UE of claim 2, wherein the at least one processor is configured to cause the UE to:
   transmit, in response to deciding to activate the SCG and in response to determining that the MCG failure does not occur, SCG activation indication information to a master node (MN); and
   determine, in response to a failure occurring during transmitting the SCG activation indication information, that the MCG failure occurs.

4. The UE of claim 2, wherein the at least one processor is configured to cause the UE to:
   generate, in response to the MCG failure occurring, MCG failure indication information.

5. The UE of claim 4, wherein the MCG failure indication information is included in a message, and wherein the message comprises at least one of:
   a RA request message in a 4-step RA procedure;
   a RA request message in a 2-step RA procedure; or
   an uplink radio resource control (RRC) message.

6. The UE of claim 2, wherein the at least one processor is configured to cause the UE to trigger, in response to the MCG failure, a procedure to re-establish a radio resource control (RRC) connection to a master node (MN).

7. A user equipment (UE) for wireless communication, comprising:
   at least one memory; and
   at least one processor coupled with the at least one memory and configured to cause the UE to:
      receive configuration information regarding one or more timers from a secondary node (SN), wherein the one or more timers are associated with a deactivated state of a secondary cell group (SCG), and wherein the one or more timers relate to a random access (RA) procedure; and
      trigger the RA procedure to the SN.

8. The UE of claim 7, wherein the one or more timers include at least one of:
   a timer for monitoring a 4-step RA type response during the deactivated state of the SCG;
   a timer for a contention resolution during the deactivated state of the SCG; or
   a timer for monitoring a 2-step RA type response during the deactivated state of the SCG.

9. The UE of claim 8, wherein the at least one processor is configured to cause the UE to:
   transmit, to the SN, at least one of a random access preamble or an index of the random access preamble; and
   start, in response to transmitting the at least one of the random access preamble and the index of the random access preamble, the timer for monitoring the 4-step RA type response.

10. The UE of claim 9, wherein the at least one processor is configured to cause the UE to:
   determine, in response to the timer for monitoring the 4-step RA type response being expired, that the RA procedure and a SCG activation procedure are not successful.

11. The UE of claim 9, wherein the at least one processor is configured to cause the UE to:
   receive, from the SN, a RA response message including a random access preamble identifier, wherein the random access preamble identifier matches the at least one of the random access preamble and the index of the random access preamble; and stop, in response to receiving the RA response message, the timer for monitoring the 4-step RA type response.

12. A method performed by a user equipment (UE), the method comprising:

deciding whether to activate a secondary cell group (SCG) associated with a secondary node (SN), wherein the SCG has been deactivated; and triggering, in response to deciding to activate the SCG, a random access (RA) procedure to the SN.

13. The method of claim 12, further comprising:

determining whether a master cell group (MCG) failure occurs.

14. The method of claim 13, further comprising:

triggering, in response to the MCG failure, a procedure to re-establish a radio resource control (RRC) connection to a master node (MN).

15. The method of claim 13, further comprising:

transmitting, in response to deciding to activate the SCG and in response to determining that the MCG failure does not occur, SCG activation indication information to a master node (MN); and determining, in response to a failure occurring during transmitting the SCG activation indication information, that the MCG failure occurs.

16. The method of claim 13, further comprising:

generating, in response to the MCG failure occurring, MCG failure indication information.

17. The method of claim 16, wherein the MCG failure indication information is included in a message, and wherein the message comprises at least one of:

a RA request message in a 4-step RA procedure;

a RA request message in a 2-step RA procedure; or an uplink radio resource control (RRC) message.

18. A method performed by a user equipment (UE), the method comprising:

receiving configuration information regarding one or more timers from a secondary node (SN), wherein the one or more timers are associated with a deactivated state of a secondary cell group (SCG), and wherein the one or more timers relate to a random access (RA) procedure; and triggering the RA procedure to the SN.

19. The method of claim 18, wherein the one or more timers include at least one of:

a timer for monitoring a 4-step RA type response during the deactivated state of the SCG;

a timer for a contention resolution during the deactivated state of the SCG; or a timer for monitoring a 2-step RA type response during the deactivated state of the SCG.

20. The method of claim 19, further comprising:

transmitting, to the SN, at least one of a random access preamble or an index of the random access preamble; and starting, in response to transmitting the at least one of the random access preamble and the index of the random access preamble, the timer for monitoring the 4-step RA type response.

* * * * *